United States Patent [19]
Cline et al.

[11] Patent Number: 6,069,626
[45] Date of Patent: *May 30, 2000

[54] METHOD AND APPARATUS FOR IMPROVED SCROLLING FUNCTIONALITY IN A GRAPHICAL USER INTERFACE UTILIZING A TRANSPARENT SCROLL BAR ICON

[75] Inventors: Troy Lee Cline, Cedar Park; Ricky Lee Poston, Austin, both of Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,356

[22] Filed: Feb. 27, 1997

[51] Int. Cl.[7] .................................................. G06F 3/14
[52] U.S. Cl. ........................ 345/341; 345/347; 345/435
[58] Field of Search ................................... 345/326, 344, 345/352, 432, 433, 434, 435, 339, 341, 347, 123

[56] References Cited

U.S. PATENT DOCUMENTS

| | | | |
|---|---|---|---|
| 5,485,174 | 1/1996 | Henshaw et al. | 345/123 |
| 5,528,260 | 6/1996 | Kent | 345/123 |
| 5,581,670 | 12/1996 | Bier et al. | 345/326 |
| 5,651,107 | 7/1997 | Frank et al. | 345/344 |
| 5,655,094 | 8/1997 | Cline et al. | 345/341 |

*Primary Examiner*—Raymond J. Bayerl
*Assistant Examiner*—Cao H. Nguyen
*Attorney, Agent, or Firm*—Leslie A. Van Leeuwen; Felsman, Bradley, Vaden, Gunter & Dillon, LLP

[57] ABSTRACT

The present invention is directed to a method and apparatus for improved scrolling functionality in a graphical user interface utilizing a software tether. Preferably, the invention is utilized in a data processing system which supports a graphical user interface which is utilized by the operator to create, modify, or review software objects. At least one particular work space is provided in the graphical user interface. A scroll bar activation function is provided which initiates scroll bar functionality after a predefined interaction of the graphical pointing device with said graphical user interface. The data processing system is utilized to monitor for interaction between the graphical pointing device and the graphical user interface, which satisfies the scroll bar activation function. After detection of satisfaction of the scroll bar activation function, the at least one scroll bar functionality is associated with the graphical pointing device. Then, a visually perceptible, but transparent, scroll function icon is generated which associates the at least one scroll bar functionality with the graphical pointing device in the graphical user interface.

8 Claims, 7 Drawing Sheets

METHOD AND APPARATUS FOR IMPROVED SCROLLING FUNCTIONALITY IN A GRAPHICAL USER INTERFACE UTILIZING A TRANSPARENT SCROLL BAR ICON

BACKGROUND OF THE INVENTION

1. Field of the Invention

The present invention relates in general to graphical user interfaces for data processing systems, and in particular to an improved scrolling function for graphical user interfaces.

2. Description of the Prior Art

Modern data processing systems allow operators to manipulate data at astounding rates; processing speeds of microprocessors in data processing systems have long ago ceased to be a major impediment to the speed and efficiency of most operator activities. Instead, cumbersome user interfaces have developed into a potentially serious impediment to efficient operator interaction with data processing systems. The operations of opening, positioning, sizing, and closing windows can place considerable strain on a user, particularly when complicated tasks are being performed or when the computer display screen is crowded with overlapping windows or work areas.

One other significant impediment to efficient use of data processing systems is that the windows or work spaces provided in most graphical user interfaces are relatively small in comparison to the software objects that are displayed therein. For example, most documents cannot be contained within a single work space. Likewise, most graphical or image files cannot be displayed in the work space of a graphical user interface. Accordingly, scrolling is frequently required in order to view all parts of the software object. Most graphical user interfaces for data processing systems include scroll bars which allow for vertical and horizontal scrolling, which effectively moves the software object upward or downward and leftward or rightward through the work space, and which provides an illusion of scrolling. Typically, scrolling is accomplished by utilizing a graphical pointing device to engage the vertical or horizontal scroll bar icon. Typically, the vertical scroll bar icon is located adjacent the work space, and includes a scroll bar track and a scroll bar slider member which is movable relative to the scroll bar track. The horizontal scroll bar is typically located at the bottom of the work space and likewise includes a scroll bar track and a scroll bar slider member which is movable relative to the scroll bar track. Typically, to initiate scrolling, the graphical pointing device must be located on the scroll bar icon, and the left mouse button must be depressed in a clicking operation which allows for a drag-and-drop manipulation of the scroll bar slider member relative to the scroll bar track or, alternatively, the conventional scroll buttons can be utilized to perform scrolling operations. In some prior art graphical user interfaces, the graphical pointing device may be removed from the scroll bar track, without interrupting the scroll bar functionality. In other words, the graphical pointing device may be moved away from the vertical or horizontal scroll bar track, and placed in the work space. In this position, clicking the mouse and moving the graphical pointing device upward within the work space causes upward scrolling, moving the mouse downward within the work space causes downward scrolling, moving the mouse leftward within the work space causes leftward scrolling, and moving the mouse rightward within the work space causes rightward scrolling.

One impediment with the prior art approach is that it is relatively easy for the operator to become disoriented or confused about his/her location within the software object when the graphical pointing device is located within the work space and utilized for scrolling operations.

SUMMARY OF THE INVENTION

It is one objective of the present invention to provide a method and apparatus for improved scrolling functionality in a graphical user interface which utilizes a transparent scroll bar icon to provide a visually perceptible indication of location or position within a software object in the graphical user interface in order to provide the operator with immediate and visual feedback that he/she has successfully selected the scroll bar function for scrolling. Preferably, the transparent scroll bar is relatively small in size, and moves about the graphical user interface with the graphical pointing device and does not provide any substantial impediment to the visibility of the graphical user interface or the software objects displayed therein.

These and other objectives are achieved as is now described. The present invention is directed to a method and apparatus for improved scrolling functionality in a graphical user interface utilizing a visually perceptible, but transparent, scroll bar icon. Preferably, the invention is utilized in a data processing system which supports a graphical user interface which is utilized by the operator to create, modify, or review software objects. At least one particular work space is provided in the graphical user interface. A scroll bar activation function is provided which initiates scroll bar functionality after a predefined user input, such as, for example, a predefined interaction of the graphical pointing device with the graphical user interface. The data processing system is utilized to monitor for interaction between the graphical pointing device and the graphical user interface. After detection of satisfaction of the scroll bar activation function, a visually perceptible but transparent scroll bar icon is generated which associates the at least one scrolling function with the graphical pointing device in the graphical user interface.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
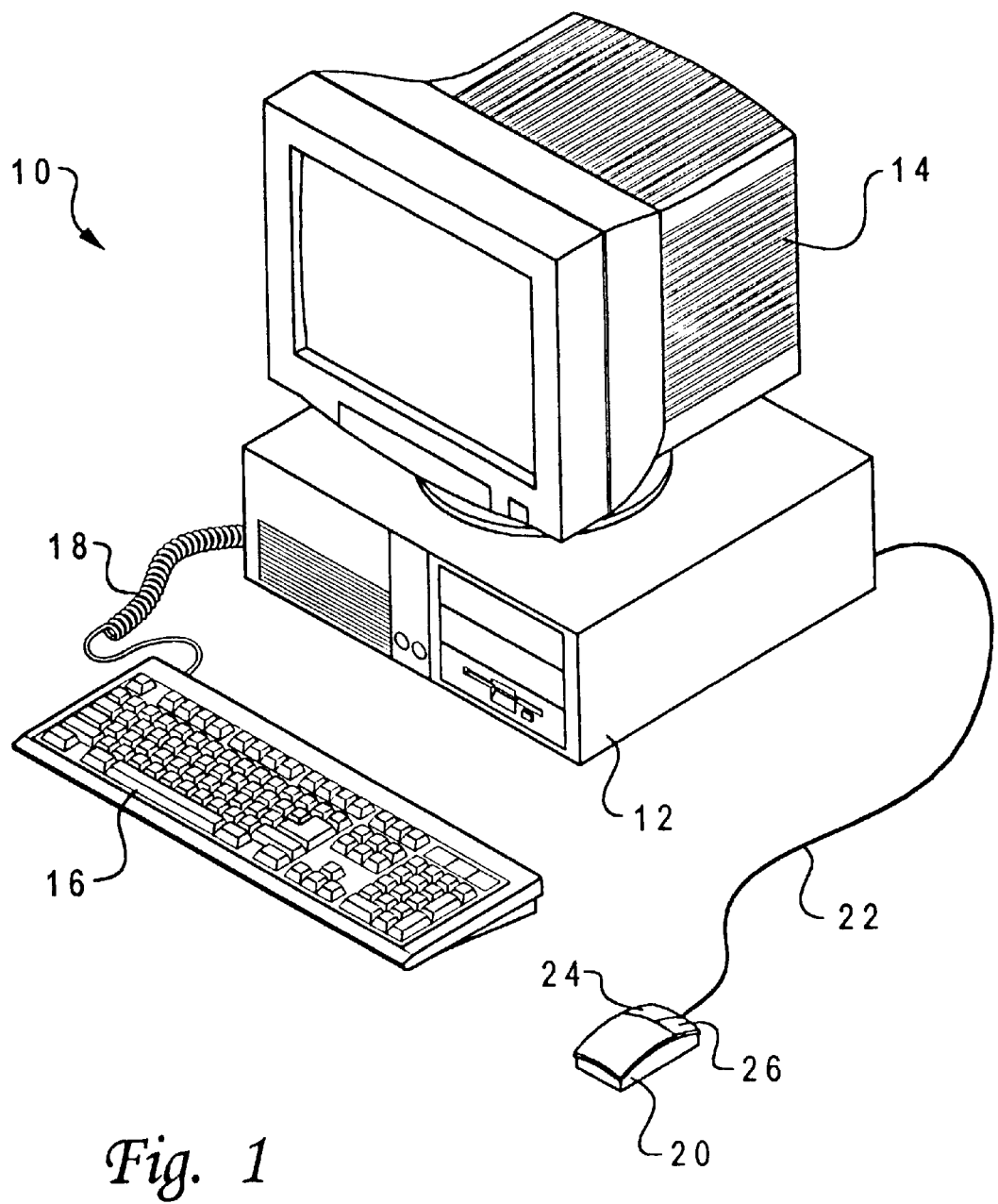
FIG. 1 is a pictorial representation of a data processing system which may be utilized to implement the method and apparatus of the present invention

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a so-called personal computer, such as those manufactured by International Business Machines Corporation.

Figure 2:
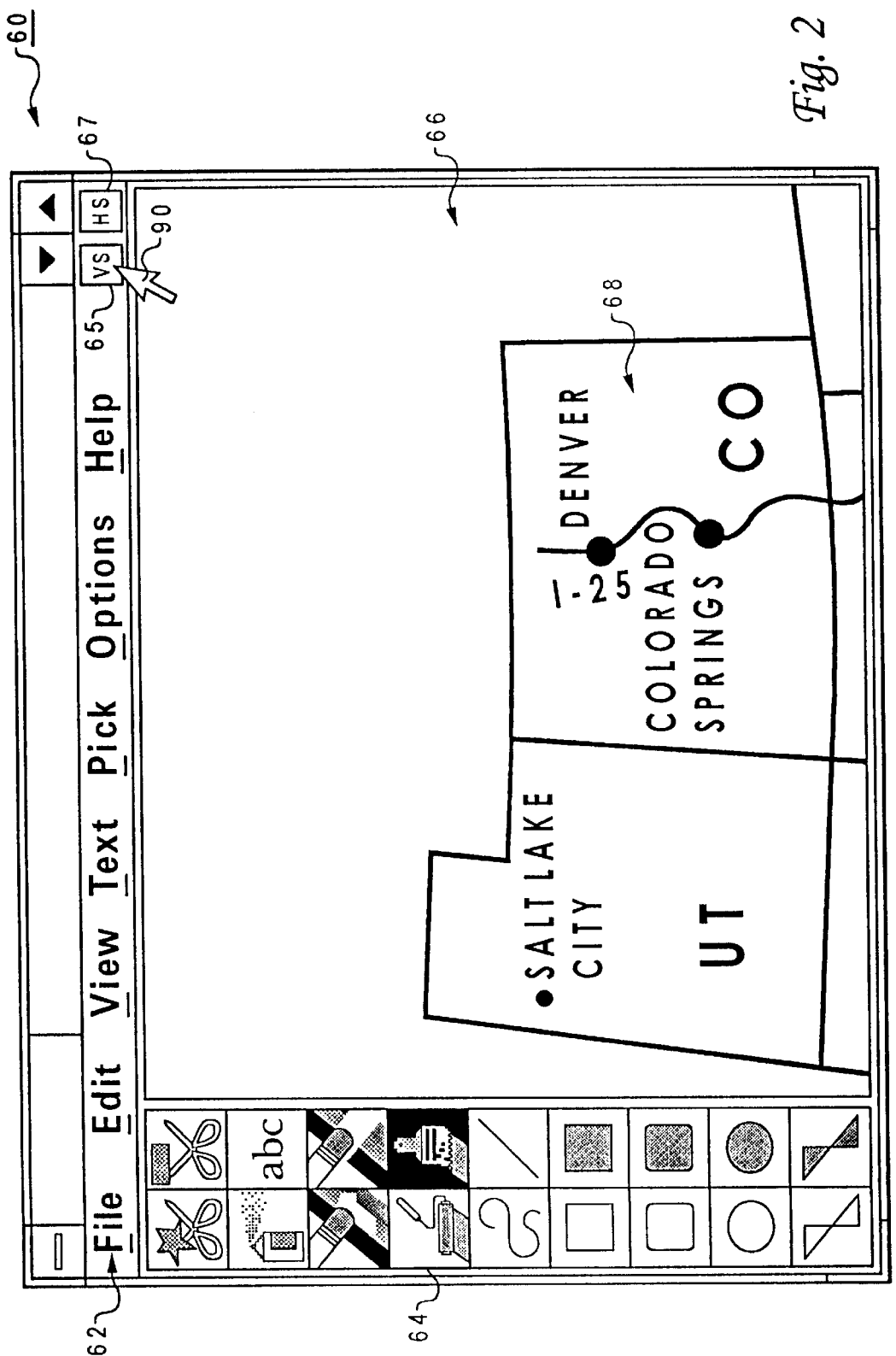
FIGS. 2 through 5 are pictorial representations of a graphic user interface which utilizes the method and apparatus for improved scrolling functionality of the present invention.

FIG. 2 depicts a graphical user interface 60 which may be displayed in video display 14 of data processing system 10 (of FIG. 1) and is only exemplary of one type of commercially available graphical user interface. The interface depicted in FIG. 2 is a graphical user interface from the "Paintbrush Program" of the Microsoft Windows Program 3.11. As is shown, the graphical user interface 60 includes textual commands 62 which may be selected through use of either the cursor or graphical pointing device 90, iconographic representations 64 of program functions which are available, and a workspace 66. Workspace 66 is utilized to create, modify, or review software objects which are composed of textual components, graphical components, or a mixture of textual and graphical components. In FIG. 2, software object 68 is a map of the American Southwest which includes textual and graphical components. As is typical, software object 68 is much too large in size to be presented in its entirety within workspace 66. In order to bring other portions of software object 68 into view, scrolling operations may be performed in accordance with the present invention. As is conventional, graphic user interface 60 includes graphical pointing device 90 which may be utilized to manipulate the software objects and icons within the graphical user interface.

In accordance with the present invention, the data processing system 10 is programmed with a scroll bar activation function which initiates scroll bar functionality after detection of a predefined interaction of graphical pointing device 90 with graphical user interface 60. One example of a preferred interaction is the placement of graphical pointing device 90 over either of vertical scroll button 65 or horizontal scroll button 67 and concurrent clicking of one or more buttons on the mouse or other end device which is associated with graphical pointing device 90. Any novel or conventional user input, including interaction between graphical pointing device 90 and graphical user interface 60, may be utilized as the scroll bar activation function. One exemplary alternative would be to initiate a scroll bar functionality when there is detected interaction with a conventional scroll bar, such as interaction between the graphical pointing device 10 and any designated portion of the scroll bar track and shuttle. In accordance with this alternative technique, graphic pointing device 90 is located over shuttle member of a vertical or horizontal scroll bar icon. Concurrent activation of one or more of the buttons on the mouse initiates the scroll bar functionality.

As is shown in FIG. 2, graphical pointing device 90 may be moved by the operator to be located over a particular one of vertical scroll button 65 and/or horizontal scroll button 67 in order to activate the improved scrolling functionality of the present invention and to initiate the generation of a visually perceptible, but transparent, scroll function icon. The visually perceptible, but transparent, scroll function icon provides a visually perceptible cue to the operator that the scrolling functionality has been engaged. Additionally, it provides a visual indication of the relative portion of the software object 68 which is in view within workspace 66.

Figure 3:
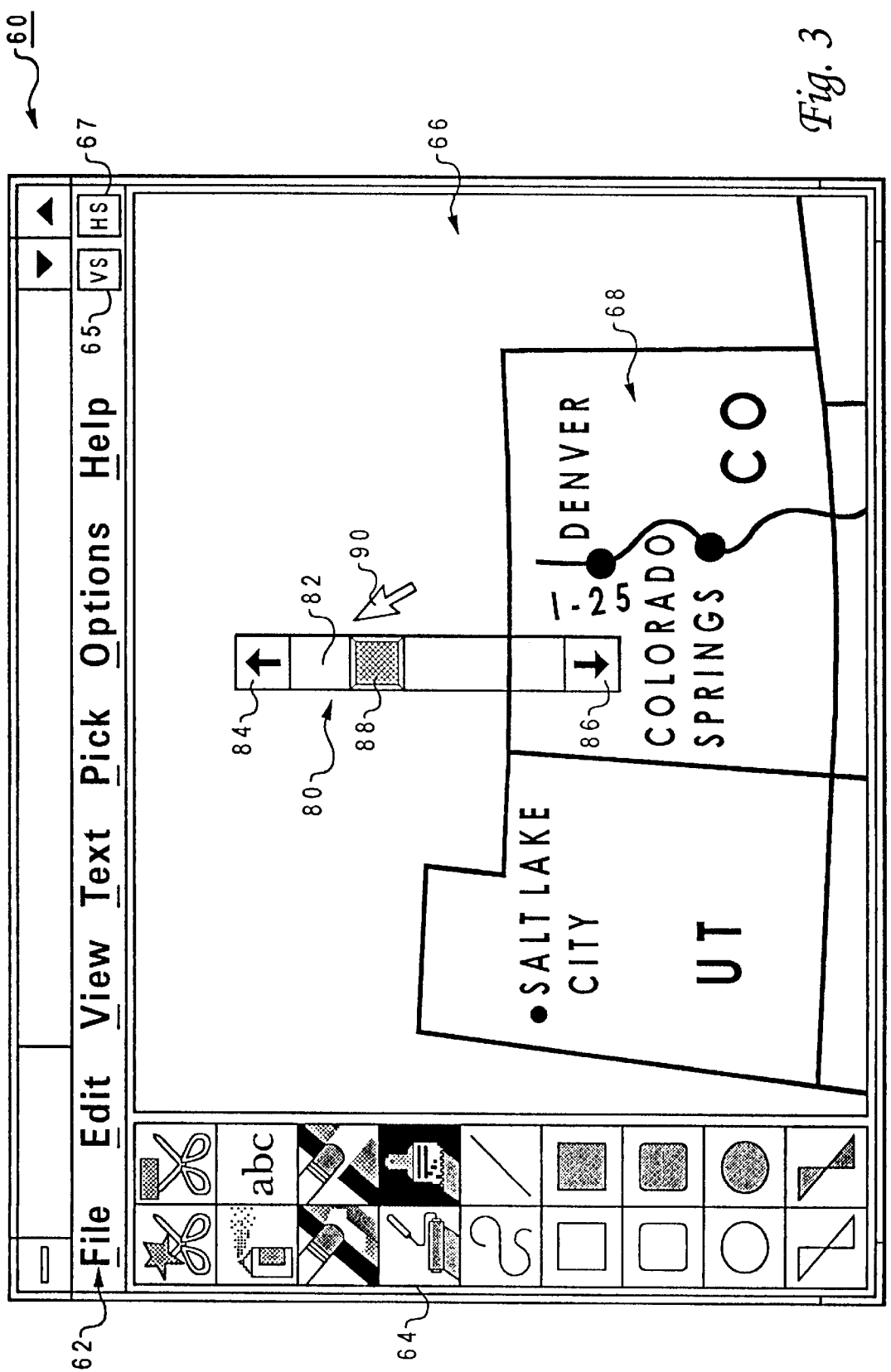

FIG. 3 is a pictorial representation of graphical user interface 60, which includes visually perceptible, but transparent, scroll function icon 80. In the preferred embodiment of the present invention, scroll function icon 80 is located proximate to or adjacent the graphical pointing device 90. In the preferred embodiment, it is composed of relatively faint lines in the video display which do not substantially impede the visibility and readability of the portions of the software object 68 which underlie it. Preferably, visually perceptible, but transparent, scroll function icon 80 includes a scroll function track 82, with upward movement button 84 located at its upper end and lower movement button 86 located at its lower end. As is conventional, the buttons may be actuated utilizing a conventional clicking operation in order to perform upward or downward scrolling. Alternatively, graphical pointing device 90 may be moved relative to workspace 66 by the operator in order to initiate upward or downward scrolling. A scroll bar slider icon 88 is also provided within visually perceptible, but transparent, scroll function icon 80. As is conventional, scroll bar slider 88 is moved upward and downward relative to scroll bar function track 82 in order to provide a visual indication of the relative portion of software object 68 which is within the present view of workspace 66. Scroll bar slider 88 will move upward and downward as graphical pointing device 90 is moved upward and downward relative to workspace 66.

Figure 4:
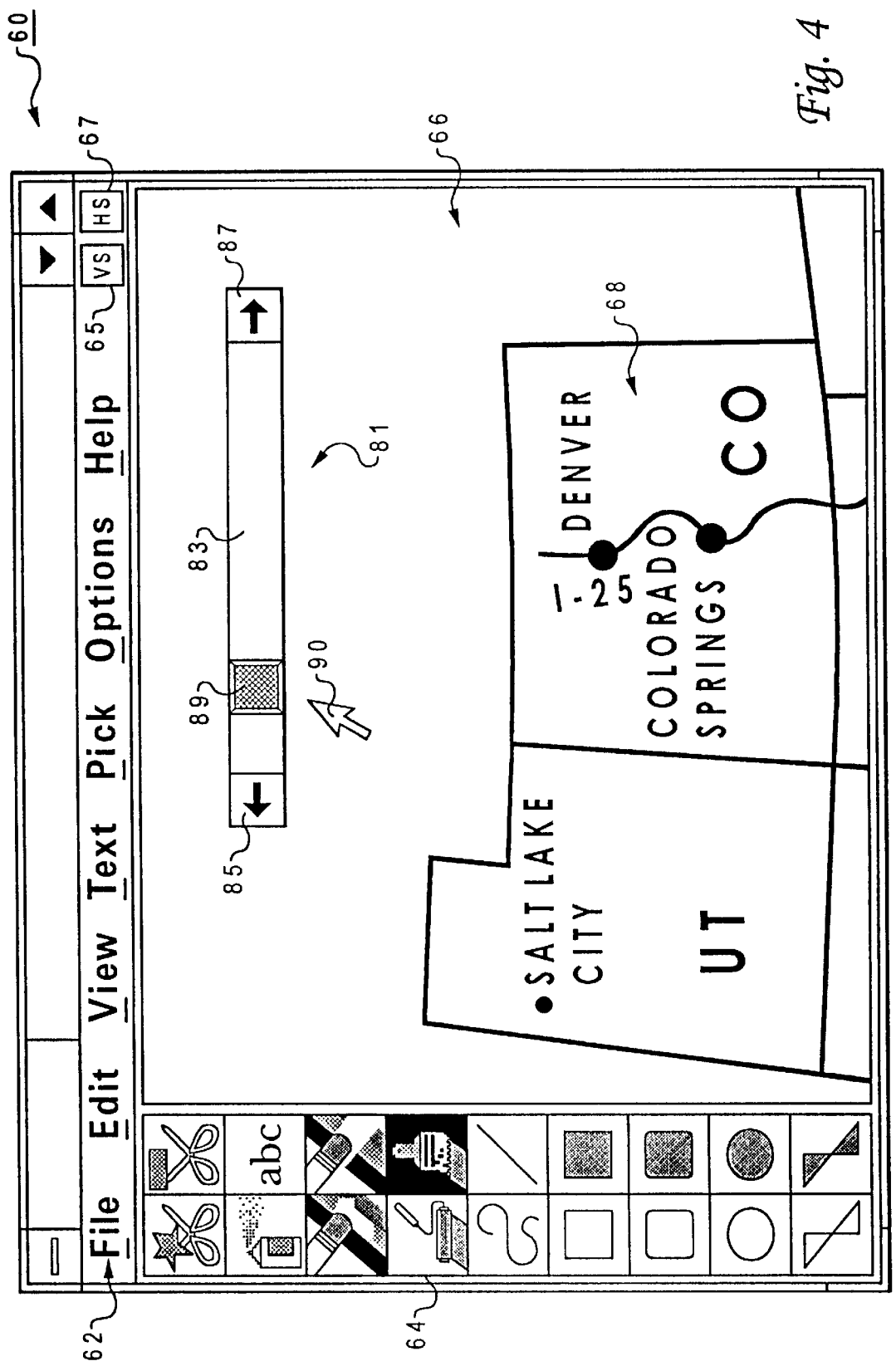

FIG. 4 depicts the selection of the horizontal scroll button 67. As is shown, a visually perceptible, but transparent, scroll function icon 81 is provided within graphical user interface 60, and is preferably located proximate to or adjacent graphical pointing device 90. In the preferred embodiment of the present invention, visually perceptible, but transparent, scroll function icon 81 is composed of relatively faint traces in the video display of data processing system 10, and does not substantially interfere with the visibility or readability of the software objects which may be contained beneath it. Preferably, visually perceptible, but transparent, scroll function icon 81 moves about within workspace 66 as graphical pointing device 90 is moved. Once the scroll functionality has been enabled, graphical pointing device 90 may be moved leftward or rightward relative to workspace 66 in order to scroll the software object 68 through workspace 66. The visually perceptible, but transparent, scroll function icon 81 is similar to the horizontal icon discussed in FIG. 3. It includes a scroll bar track 83, and a leftward button 85 and a rightward button 87, both of which may be used to initiate scrolling of the software object 68. Alternatively, graphical pointing device 90 may be moved relative to workspace 66, either leftward or rightward, in order to initiate and continue horizontal scrolling functionality.

Figure 5:
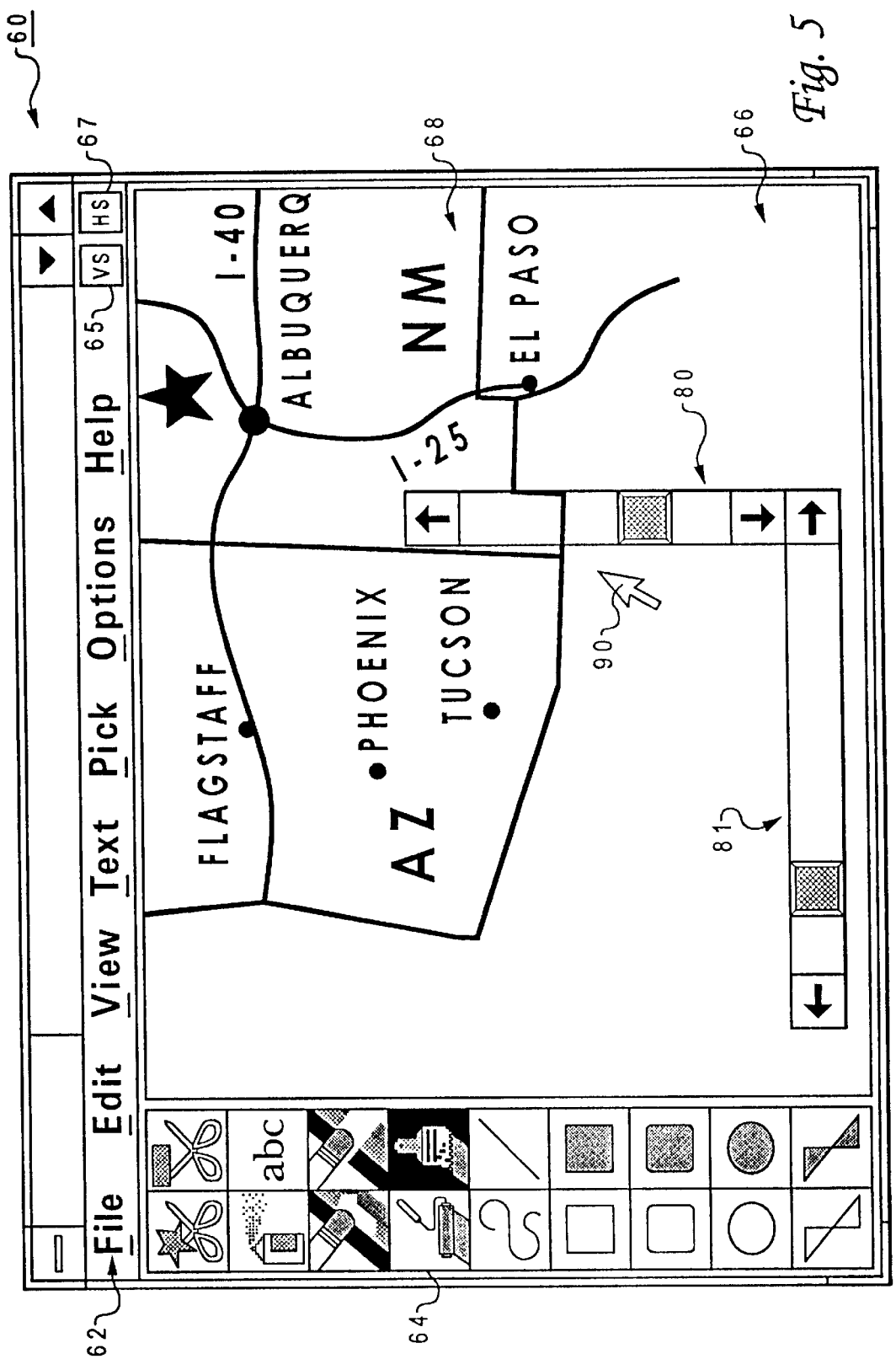

FIG. 5 depicts a situation wherein both the horizontal scrolling functionality and vertical scrolling functionality have been selected by the operator. As is shown, a vertical visually perceptible, but transparent, scroll function icon 80 is provided within the workspace 66 of graphical user interface 60 adjacent graphical pointing device 90. Also, a horizontal visually perceptible, but transparent, scroll function icon 81 is likewise displayed within workspace 66 of graphical user interface 60 adjacent graphical pointing device 90. The movement of graphical pointing device 90 relative to workspace 66 will initiate horizontal scrolling, vertical scrolling, or a combination of vertical and horizontal scrolling. The visually perceptible, but transparent, scroll function icons will provide a continuous display of the relative portion of software object 68 which is within view of workspace 66. The visually perceptible, but transparent, scroll function icons 80, 81, will move about workspace 66 as graphical pointing device 90 is moved about workspace 66.

While the present invention has been depicted as a full replacement for conventional scroll bar icons, it may be used in combination with convention scroll bar icons to provide an alternative or additional functionality available to the operator which facilitates scrolling operations. Additionally, while the visually perceptible, but transparent, scroll function icons have been depicted herein as extending only over a portion of workspace 66, in alternative embodiments the visually perceptible, but transparent, scroll function icon may extend across the entire workspace. Finally, while the visually perceptible, but transparent, scroll function icon depicted in the preferred embodiment is visually similar to a conventional scroll bar icon, any novel or conventional graphical depiction of location within a software object may be utilized in lieu of the conventional scroll bar icons which have been utilized in discussing the preferred embodiment herein.

Figure 6A:
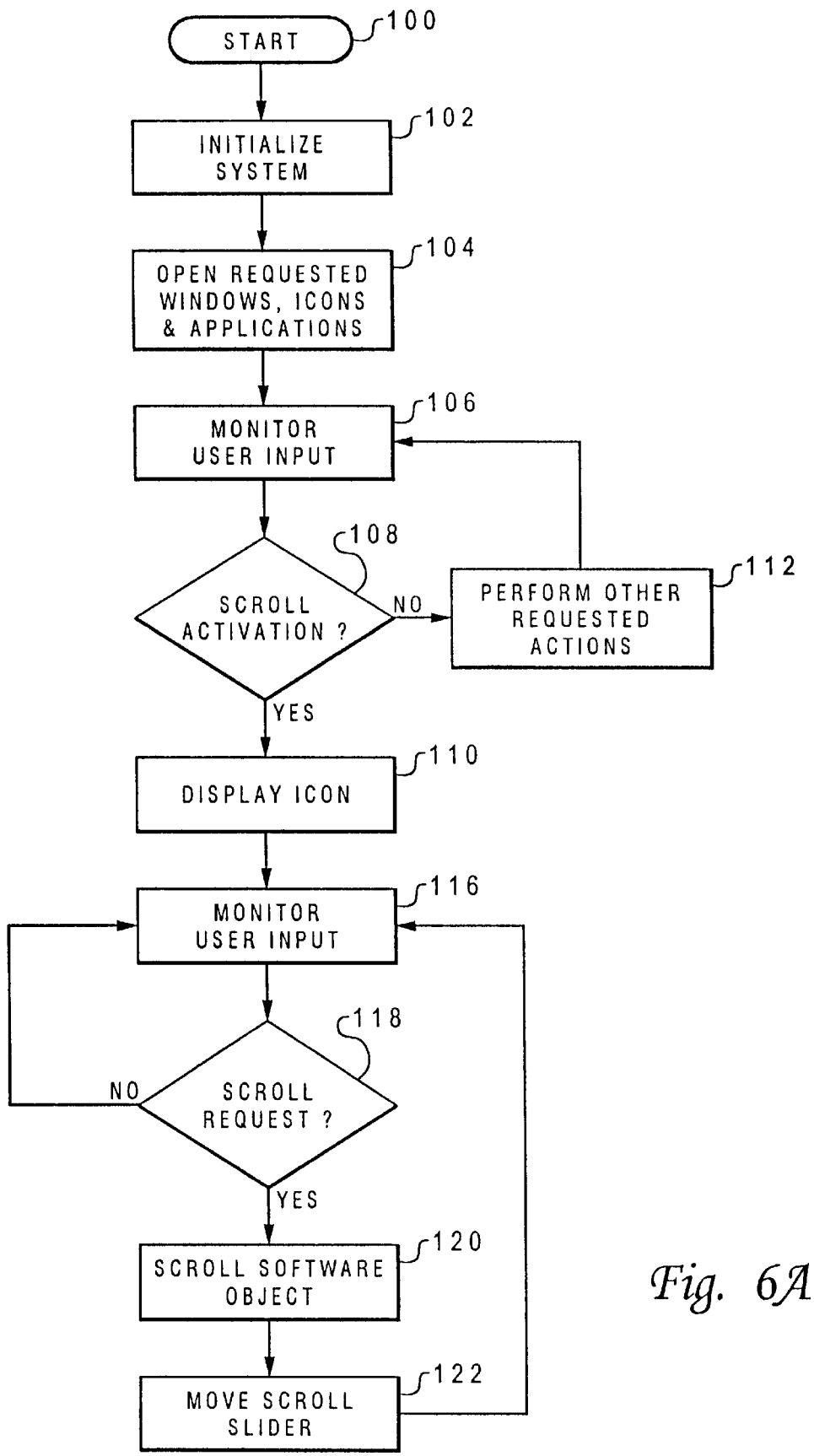
FIGS. 6A and 6B are flowchart representations of a computer program implementation of the method and apparatus for improved scrolling functionality of the present invention.
Figure 6B:
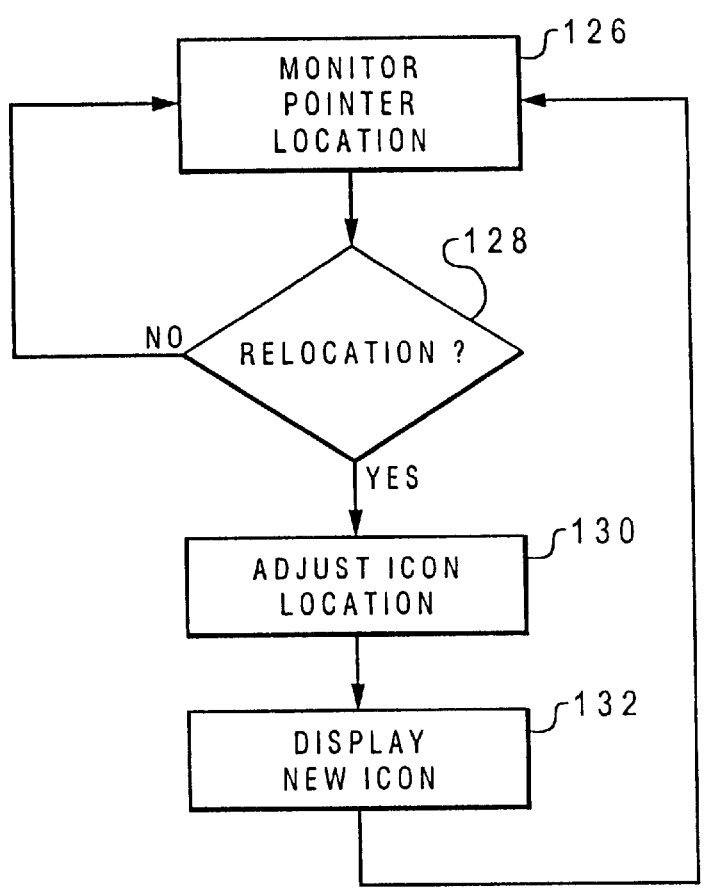

FIGS. 6A and 6B depict in flowchart form the preferred computer program operations which are required to implement the present invention. With reference first to FIG. 6A, the process starts at software block 100, and continues at software block 102 in which the data processing system 10 is initialized, in accordance with conventional techniques. The process continues in software block 104, wherein routines for requested windows, and corresponding icons, as well as requested applications are opened by the data processing system 10. In block 106, user input is monitored to determine if a scroll function actuation is requested. If the data processing system 10 determines that a scroll function is not requested, other requested actions are performed, as is set forth in software block 112.

If, however, a scroll actuation function is requested in software block 108, the process continues in block 110, wherein a visually perceptible, but transparent, scroll function icon is generated and displayed on video display 14 of data processing system 14 of data processing system 10, In accordance with software block 116, user input is monitored in workspace 32, in order to determine if a "scroll" is requested. Either left button 24 or right button 26 may be used to "click" mouse 20, thus initiating the scrolling functionality 36. Software block 118 represents the monitoring and detection of a request for scrolling. In software block 120, the requested scrolling operation is performed as the graphical pointing device 90 is moved. As the scrolling is performed, in accordance with software block 122, the scroll bar slider is moved with the scroll function icon to provide a visual cue as to location within the software object.

When the scroll functionality is no longer desired, either left button 24 or right button 26 may be used to "click" mouse 20, in a predetermined manner, in order to disable the scrolling functionality and to remove the visually perceptible, but transparent, scroll function icon.

FIG. 6B depicts the software routines utilized by the present invention in order to accommodate relocation of graphical pointing device 90 within graphical user interface 60. The process begins at software block 126 wherein data processing system 10 monitors user input to determine pointer location. In accordance with software block 128, data processing system 10 monitors for relocation; if no relocation is detected, control returns to software block 126; however, if relocation occurs, control passes to software block 130 wherein program instructions are utilized to adjust the location of the visually perceptible, but transparent, scroll function icon to accommodate the new location of the graphical pointing device. Next, in accordance with software block 132, a visually perceptible, but transparent, scroll function icon is displayed in the visual display of data processing system 10. In accordance with the preferred embodiment of the present invention, the relocation of the icon is dynamically performed.

What is claimed is:

1. A method in a graphical user interface of a data processing system, including at least one particular work space displaying at least one particular software object, for providing an indication of selected scrolling functionality, comprising the data processing implemented steps of:

(a) providing a scroll bar activation function which initiates scroll bar functionality after predefined interaction of a graphical pointing device associated with said data processing system and said graphical user interface;

(b) monitoring for interaction between said graphical pointing device and said graphical user interface which satisfies said scroll bar activation function;

(c) after detection of satisfaction of said scroll bar activation function, associating said scroll bar functionality with said graphical pointing device and with one particular software object of said at least one particular software object;

(d) visually representing said association of said scroll bar functionality with said graphical pointing device with a visually perceptible, but transparent, scroll function icon, including at least one scroll bar function track and at least one scroll bar function slider, in said graphical user interface located proximate to said graphical pointing device without otherwise affecting display of said at least one particular software object in at least one particular work space;

(e) monitoring for relocation of said graphical pointing device;

(f) adjusting the position of said visually perceptible, but transparent, scroll function icon in response to relocation of said graphical pointing device without selection of said scroll function icon;

(g) moving said one particular software object through said at least one particular work space in a predefined manner in response to detected relocation of said visually perceptible, but transparent, scroll function icon;

(h) providing a visual indication of a relative portion of said one particular software object which is within present view through the relative position of said at least one scroll bar function slider relative to said at least one scroll bar function track.

2. A method according to claim 1:
wherein said scroll bar functionality comprises a horizontal scroll bar functionality and a vertical scroll bar functionality;
wherein said visually perceptible, but transparent, scroll function icon comprises at least one horizontal scroll function icon extending horizontally across said at least one particular work space adjacent said graphical pointing device, and at least one vertical scroll function icon extending vertically across said at least one particular work space adjacent said graphical pointing device;
wherein movement of said horizontal scroll function icon results in movement of said at least one particular software object horizontally through said at least one particular work space; and
wherein movement of said vertical scroll function icon results in movement of said at least one particular software object vertically through said at least one particular work space.

3. A data processing system for providing an indication of selected scrolling functionality of at least one particular software object displayed therein, comprising:
(a) means for providing at least one work space in a graphical user interface;
(b) means for providing a graphical pointing device;
(c) a scroll bar activation routine which initiates scroll bar functionality after detection of a predefined interaction of said graphical pointing device and said graphical user interface;
(d) means for monitoring for interaction between said graphical pointing device and said graphical user interface which satisfies said scroll bar activation routine;
(e) means for associating said at least one scroll bar functionality with said graphical pointing device after detection of satisfaction of said scroll bar activation routine and with one particular software object of said at least one particular software object;
(f) means for visually representing said association of said at least one scroll bar functionality with said graphical pointing device with a visually perceptible, but transparent, scroll function icon, including at least one scroll bar function track and at least one scroll bar function slider, in said graphical user interface without otherwise affecting display of said at least one particular software object displayed in said at least one work space in said graphical user interface;
(g) means for monitoring for relocation of said graphical pointing device;
(h) means for adjusting the position of said visually perceptible, but transparent, scroll function icon in response to relocation of said graphical pointing device without selection of said scroll function icon; and
(i) means for providing a visual indication of a relative portion of said one particular software object which is within present view through the relative position of said at least one scroll bar function slider relative to said at least one scroll bar function track.

4. A data processing system according to claim 3:
wherein said at least one scroll bar functionality comprises a horizontal scroll bar functionality and a vertical scroll bar functionality;
wherein said visually perceptible connection comprises a horizontal scroll function icon extending horizontally across at least a portion of said at least one workspace and adjacent said graphical pointing device, and a vertical scroll function icon extending vertically across at least a portion of said at least one work space and adjacent said graphical pointing device;
wherein movement of said horizontal scroll function icon results in movement of said at least one particular software object horizontally through said at least one particular work space; and
wherein movement of said vertical scroll function icon results in movement of said at least one particular software object vertically through said at least one particular work space.

5. A method in a graphical user interface of a data processing system, including at least one particular work space displaying at least one particular software object, for providing an indication of selected scrolling functionality, comprising the data processing implemented steps of:
(a) providing in said graphical user interface a visually perceptible, but transparent, scroll function icon;
(b) monitoring for relocation of said graphical pointing device;
(c) adjusting the position of said visually perceptible, but transparent, scroll function icon in response to said relocation of said graphical pointing device and to maintain said scroll function icon relatively close to said graphical pointing device without selection of said scroll function icon;
(d) utilizing said scroll function icon to provide a visual indication of a relative portion of said one particular software object which is within present view.

6. A method according to claim 5:
wherein said visually perceptible, but transparent, scroll function icon includes at least one horizontal scroll function icon extending horizontally across said at least one particular work space adjacent said graphical pointing device, and at least one vertical scroll function icon extending vertically across said at least one particular work space adjacent said graphical pointing device;
wherein movement of said horizontal scroll function icon results in movement of said at least one particular software object horizontally through said at least one particular work space; and
wherein movement of said vertical scroll function icon results in movement of said at least one particular software object vertically through said at least one particular work space.

7. A data processing system for providing an indication of selected scrolling functionality of at least one particular software object displayed therein, comprising:
(a) a visually perceptible, but transparent, scroll function icon;
(b) means for monitoring for relocation of said graphical pointing device;
(c) means for adjusting the position of said visually perceptible, but transparent, scroll function icon in response to said relocation of said graphical pointing device and to maintain said scroll function icon relatively close to said graphical pointing device without selection of said scroll function icon; and (d) means for providing a visual indication of a relative portion of said one particular software object which is within present view through said scroll function icon.

8. A date processing system according to claim 7:

wherein said visually perceptible connection comprises a horizontal scroll function icon extending horizontally across at least a portion of said at least one workspace and adjacent said graphical pointing device, and a vertical scroll function icon extending vertically across at least a portion of said at least one work space and adjacent said graphical pointing device;

wherein movement of said horizontal scroll function icon results in movement of said at least one particular software object horizontally through said at least one particular work space; and wherein movement of said vertical scroll function icon results in movement of said at least one particular software object vertically through said at least one particular work space.

* * * * *